C. S. SHARP.
DISK HARROW.
APPLICATION FILED MAR. 2, 1911.

1,007,982.

Patented Nov. 7, 1911.
5 SHEETS—SHEET 1.

WITNESSES:
F.W. Hoffmeister
C. C. Palmer.

INVENTOR.
Charles S. Sharp.
BY E.W. Burgess
ATTORNEY.

C. S. SHARP.
DISK HARROW.
APPLICATION FILED MAR. 2, 1911.
1,007,982.
Patented Nov. 7, 1911.
5 SHEETS—SHEET 2.
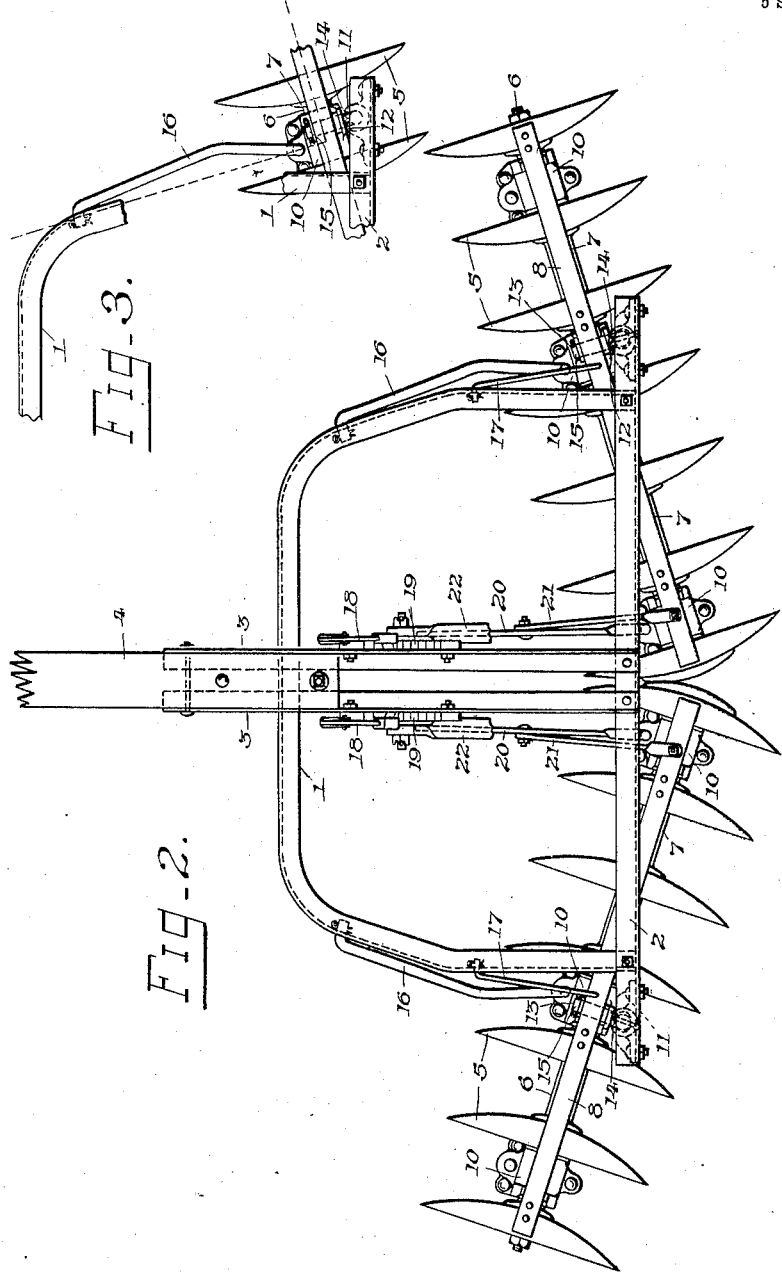
WITNESSES:
F.W. Hoffmeister
C. C. Palmer.
INVENTOR.
Charles S. Sharp.
BY
E.W. Burgess
ATTORNEY.

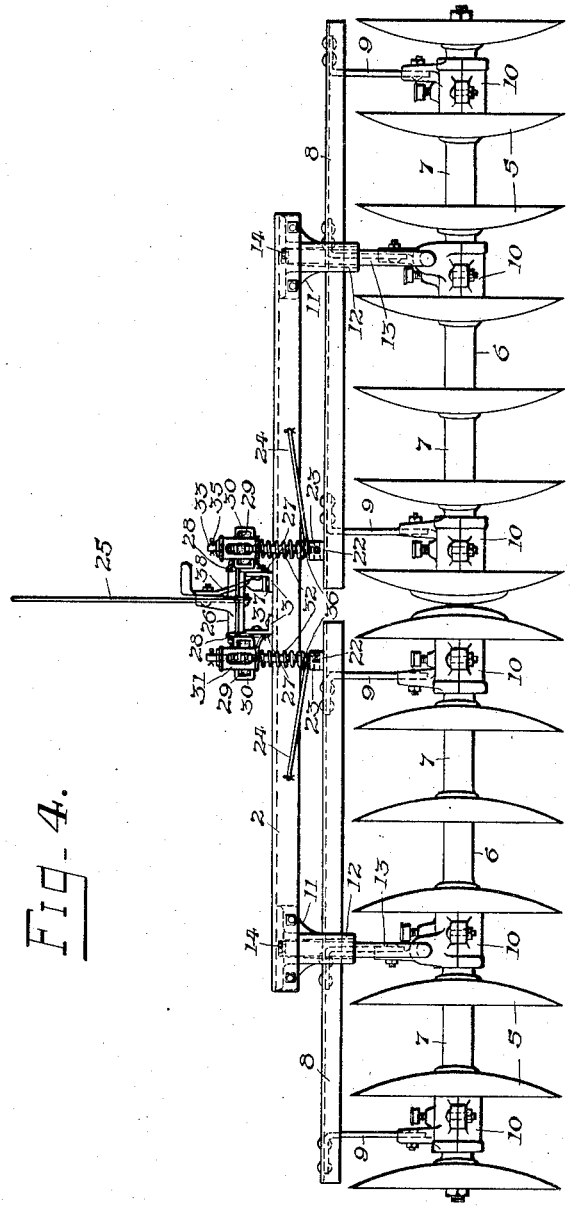

C. S. SHARP.
DISK HARROW.
APPLICATION FILED MAR. 2, 1911.

1,007,982.

Patented Nov. 7, 1911.
5 SHEETS—SHEET 4.

WITNESSES:
F. W. Hofmeister
C. C. Palmer

INVENTOR.
Charles S. Sharp
BY E. W. Burgess
ATTORNEY.

C. S. SHARP.
DISK HARROW.
APPLICATION FILED MAR. 2, 1911.
1,007,982.
Patented Nov. 7, 1911.
5 SHEETS—SHEET 5.
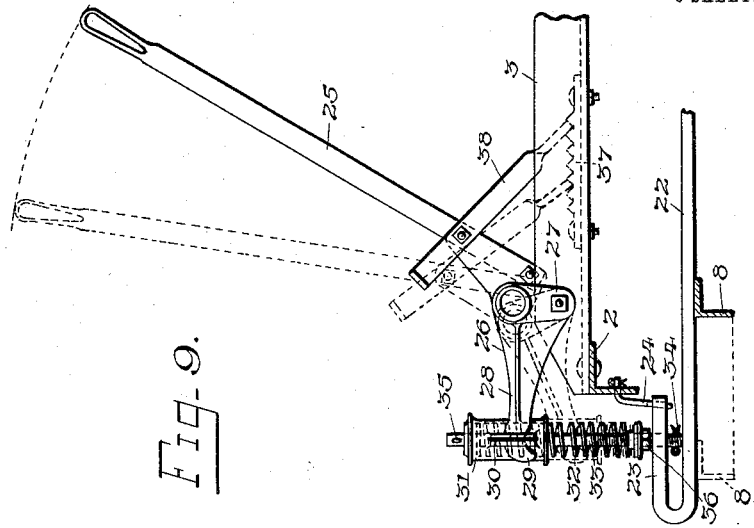
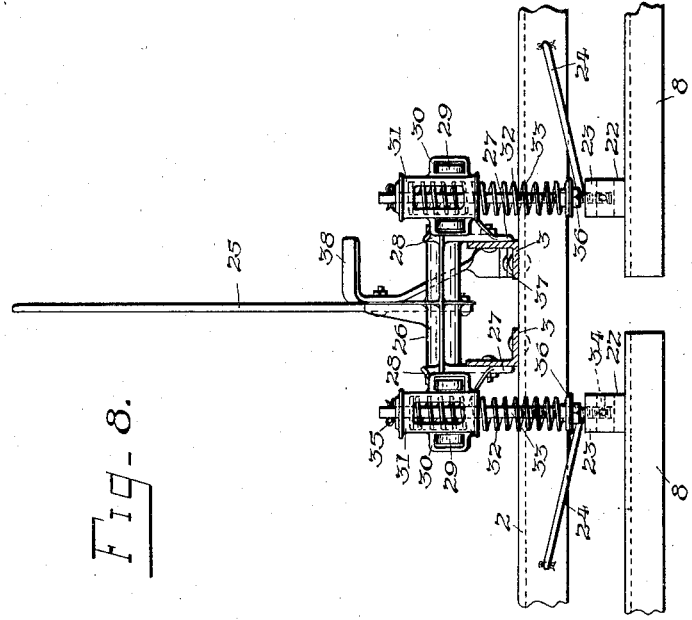
WITNESSES:
F. W. Hoffmeister
C. C. Palmer
INVENTOR.
Charles S. Sharp.
BY
E. W. Burgess
ATTORNEY.

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

DISK HARROW.

1,007,982. Specification of Letters Patent. Patented Nov. 7, 1911.

Application filed March 2, 1911. Serial No. 611,766.

*To all whom it may concern:*

Be it known that I, CHARLES S. SHARP, a citizen of the United States, residing at Auburn, in the county of Cayuga and State of New York, have invented certain new and useful Improvements in Disk Harrows, of which the following is a specification.

My invention relates to disk harrows of the adjustable gang class, its object being to provide a construction of harrow having improved means whereby the disk gangs are flexibly connected with the draft frame, a novel connection of the draft rods with the gang frames and draft frame, whereby the line of draft of the rods is substantially at right angles with the axes of the gangs when the latter are in operative position, and means for applying spring pressure between the draft frame and the inner ends of the gang frames that may be readily controlled by the operator. I attain these objects by means of the mechanism illustrated by the accompanying drawings, in which—

Figure 1:
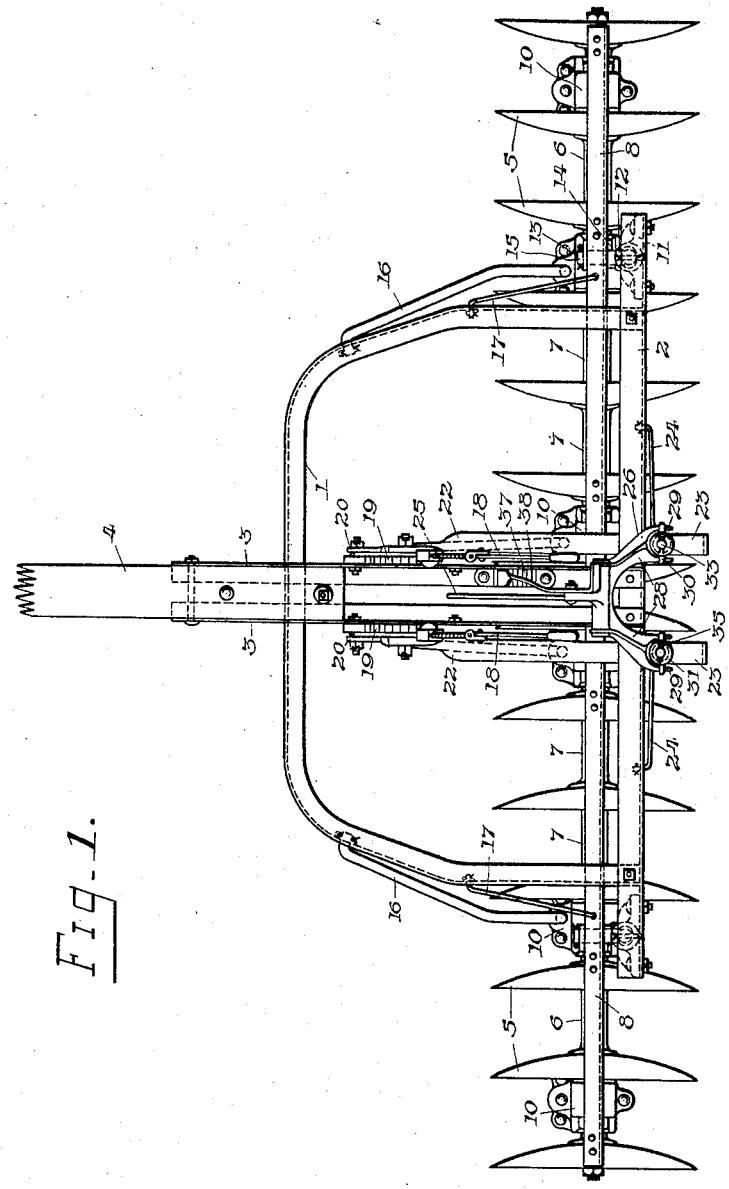
Figure 5:
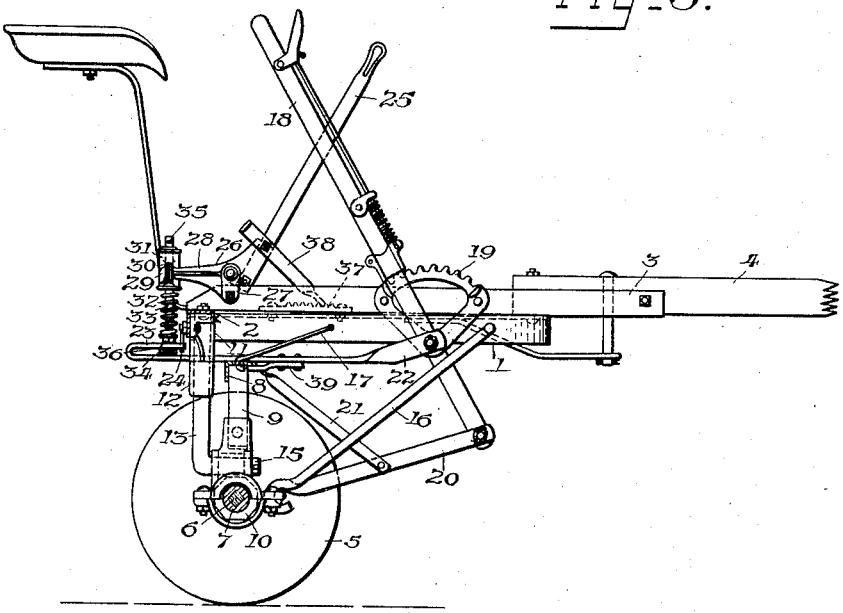
Figure 7:
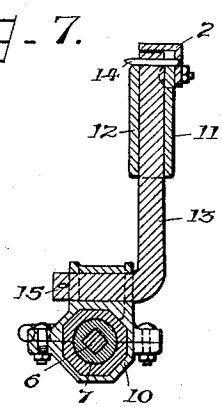
Figure 6:
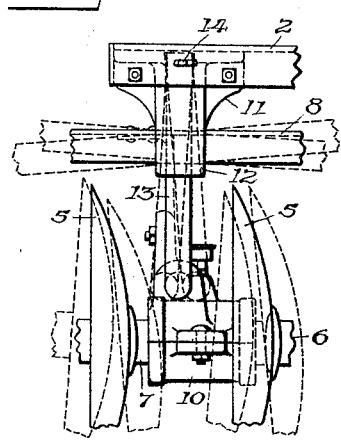

Figure 1 represents a top plan view of a disk harrow having my invention forming a part thereof; Fig. 2 is a similar view showing the disk gangs in annular relation relative to each other; Fig. 3 is a detached detail of Fig. 2, designed to illustrate the manner of connecting the draft rods with the draft frame and gang frames; Fig. 4 is a rear elevation of Fig. 1; Fig. 5 is an end elevation of Fig. 1, showing the gang axle, its frame and a portion of the draft frame in cross section; Fig. 6 is a detached detail designed to illustrate the flexible connection between the gang frames and the draft frame; Fig. 7 is a vertical section of Fig. 6; Fig. 8 is a rear elevation of part of Fig. 4 on an enlarged scale designed to represent the manner of applying spring pressure to the inner ends of the gangs; and Fig. 9 is a side elevation of Fig. 8.

The same reference numerals designate like parts throughout the several views.

1 represents a U-shaped draft frame member having its rear ends connected by means of a transversely arranged frame member 2, and its front middle portion secured to frame members 3 arranged in the direction of the line of draft and spaced apart in a manner to receive between their forward ends a draft tongue 4, their rear ends being secured to frame member 2; 5 represents disks that are mounted in two gangs, having axles 6 and spacing spools 7 of a common form; 8 represents main gang frame members arranged parallel with the axes of the disk gangs and having secured thereto a series of short depending gang frame members 9 that have their lower ends secured to bearing boxes 10 in which the gang axles are journaled; two of the bearing boxes being arranged at opposite ends of the gangs, and one intermediate their ends.

11 represents brackets secured to the outer ends of the draft frame member 2 and provided with depending socket members 12 that are adapted to receive the upper ends of connecting bars 13 in a turnable manner, the sockets being elongated in a lateral direction, permitting a limited swinging movement of the connecting bars at their lower ends relative to the draft frame member, as shown in Fig. 6; the bars being secured to the brackets by means of pins 14 passing through their upper ends, and provided at their lower ends with forwardly turned portions 15 that are arranged parallel with the draft frame and received by openings in the intermediate bearing boxes of the disk gangs in a manner permitting the gangs to rock about their axes.

16 represents draft links having their forward ends pivotally connected with the side members of the U-shaped draft frame, and their rear ends with the intermediate bearing boxes of the gang frames, the connection of the rods with the draft frame being on a line passing through the axis of their connection with the disk gangs and substantially at right angles with the axis of the gangs when the latter are thrown to an operative angle relative to the line of draft, as shown in Figs. 2 and 3.

17 represents supplemental connections consisting of links that have their forward ends pivotally connected with the draft frame, and their rear ends with the gang frame members 8 and operative to assist the connecting bars 13 in maintaining the gang frames in proper position relative to the draft frame.

Means for varying the angle of the disk gangs relative to the line of draft include hand levers 18 pivotally mounted upon frame members 3, one for each gang, and operatively connected in a common way with toothed sectors 19 for holding the levers in any desired position of adjustment, the lower ends of the levers being connected by means of links 20 with the bearing boxes at the inner ends of the gangs, and 21 represents supplemental links having their upper rear ends pivotally connected with the gang frame members 8, and their forward and lower ends with the links 20 near their middle portions.

22 represents flat pressure bars having their forward ends connected with the draft frame, preferably coaxially with the hand levers 18, their body portions engaging with the upper sides of the gang frame members 8 in a slidable manner and extending rearward of the gangs have their rear ends 23 bent upward and forward upon the body portion, and connected with the draft frame member 2 by means of laterally extending links 24.

Means for applying pressure to the rear ends of bars 22, and through them to the inner ends of the gang frames, include a hand lever 25 secured to a rocking yoke member 26 having depending ear portions 27 whereby it is pivotally connected with the frame members 3. The bracket is provided with rearwardly extending arms 28 that are provided at their rear ends with forked members 29 that are received by loops 30 upon opposite sides of cylindrical cups 31 that receive the upper ends of coiled compression springs 32, and 33 represents rods having their lower ends threaded and connected with the pressure bars 22 and retained in place by means of pins 34 and inclosed by the springs and cups have their upper ends received by openings in the upper wall of the cups and are retained in operative relation with the cups by means of pins 35, and 36 represent pressure regulating nuts upon the lower ends of the rods. A toothed plate 37 is secured to one of the frame members 3, and 38 represents a foot controlled pawl pivotally connected with the hand lever 25 and having its front end adapted to engage with the toothed plate in a manner to hold the lever in any desired position of adjustment.

39 represents clips secured to the pressure bars 22 and having between their rear ends and the bottom of said bars a space adapted to receive the gang frame members 8 when the gangs are arranged at right angles with the line of draft for transportation or other purposes.

What I claim as my invention, and desire to secure by Letters Patent, is:

1. A disk harrow including, in combination, a U-shaped draft frame having rearwardly extending side members, a transversely arranged draft frame member secured to the rear ends of said side frame members, gang frames flexibly connected with said transverse member, said gang frames including a series of bearing boxes secured thereto, gang axles journaled in said bearing boxes, draft links having their forward ends pivotally connected with the side members of said draft frame and their rear ends with one of said bearing boxes upon the adjacent gangs, the line of draft of the links being at substantially right angles with the axles of the gangs when the latter are adjusted to an operative angle with the line of draft, and means for controlling the operative angle of said gangs.

2. A disk harrow including, in combination, a U-shaped draft frame having rearwardly extending side members, a transversely arranged draft frame member secured to the rear ends of said side frame members, brackets secured to opposite ends of said transverse member, said brackets having depending socket members, gang frames having bearing boxes secured thereto, gang axles journaled in said bearing boxes, vertically arranged connecting bars having their upper ends received by said depending socket members and their lower ends turned forward at right angles to the gang axles and received by openings in the bearing boxes of the adjacent gangs.

3. A disk harrow including, in combination, a U-shaped draft frame having rearwardly extending side members, a transversely arranged draft frame member secured to the rear ends of said side frame members, brackets secured to opposite ends of said transverse member, said brackets having depending socket members, gang frames having bearing boxes secured thereto, gang axles journaled in said bearing boxes, vertically arranged connecting bars having their upper ends received by said depending socket members in a manner to turn therein and to swing at their lower ends in line with the gang axles, and having their lower ends turned forward at right angles with the gang axles and pivotally received by openings in the bearing boxes of the adjacent gangs.

4. A disk harrow including, in combination, a U-shaped draft frame having rearwardly extending side members, a transversely arranged draft frame member secured to the rear ends of said side frame members, gang frames having disk gangs mounted therein including axles, main gang frame members arranged in line with said axles and connected therewith by means of depending bars, and bearing boxes, draft rods connecting the front ends of the side members of said draft frame with said bearing boxes, and supplemental links connecting said main gang frame members with said side members of the draft frame in rear of the connection therewith of said draft rods.

5. A disk harrow including, in combination, a draft frame, disk gang frames flexibly connected with said draft frame in a manner to turn about vertical pivots and also about pivots having their axes in line with the draft, pressure bars slidably engaging with the inner ends of said gang frames and having their forward ends pivotally connected with said draft frame, and spring pressure mechanism connected with said draft frame and operatively connected with the rear ends of said pressure bars.

6. A disk harrow including, in combination, a draft frame, disk gang frames flexibly connected with said draft frame in a manner to rise and fall at their opposite ends and to turn about a vertical axis whereby the gangs may be adjusted at an angle with the line of draft, pressure bars engaging with the inner ends of said gang frames and having their inner ends pivotally connected with said draft frame, a rocking yoke pivotally connected with said draft frame and including rearwardly extending forked arms, rods having their lower ends connected with the rear ends of said pressure bars, pressure springs encircling said rods, cylindrical cups slidably mounted upon the upper ends of said rods and inclosing said springs, said forked arms being connected with said cups, and means for rocking said yoke and retaining it in any desired position of adjustment.

7. A disk harrow including, in combination, a draft frame including a transverse bar in rear thereof, disk gang frames flexibly connected with said draft frame in a manner to rise and fall at their opposite ends and to turn about a vertical axis whereby the gangs may be adjusted at an angle with the line of draft, pressure bars engaging with the inner ends of said gang frames and having their forward ends pivotally connected with said draft frame, a rocking yoke pivotally connected with said draft frame and including rearwardly extending forked arms, pressure springs connected with said forked arms and with the rear ends of said pressure bars, means for rocking said yoke and retaining it in any desired position of adjustment, and links having their inner ends connected with said pressure bars and their opposite ends with the transverse bar forming part of said draft frame.

CHARLES S. SHARP.

Witnesses:
K. T. Elliott,
C. W. Embody.

Copies of this patent may be obtained for five cents each, by addressing the "Commissioner of Patents, Washington, D. C."